United States Patent [19]

Balzer

[11] Patent Number: 5,090,196
[45] Date of Patent: Feb. 25, 1992

[54] DUCTED FAN TYPE GAS TURBINE ENGINE POWER PLANTS

[75] Inventor: Ronald L. Balzer, Bothell, Wash.

[73] Assignee: The Boeing Company, Seattle, Wash.

[21] Appl. No.: 383,871

[22] Filed: Jul. 21, 1989

[51] Int. Cl.$^5$ .............................. F02K 1/70
[52] U.S. Cl. ........................ 60/226.2; 60/230; 239/265.27
[58] Field of Search ............ 60/226.1, 226.2, 231, 60/230; 244/110 B, 204; 239/265.17, 265.27

[56] References Cited

U.S. PATENT DOCUMENTS

| | | |
|---|---|---|
| 2,489,338 | 1/1970 | Chilman . |
| 2,527,732 | 10/1950 | Imbert . |
| 2,605,984 | 8/1952 | Robinson . |
| 3,729,934 | 5/1973 | Denning et al. . |
| 3,747,341 | 7/1973 | Davis . |
| 3,820,719 | 6/1974 | Clark ........................ 60/226.2 |
| 3,824,785 | 7/1974 | Soligny et al. ............. 239/265.27 |
| 3,932,058 | 1/1976 | Harner et al. . |
| 3,936,226 | 2/1976 | Harner et al. . |
| 3,946,554 | 3/1976 | Neumann . |
| 4,005,574 | 2/1977 | Smith, Jr. . |
| 4,047,381 | 9/1977 | Smith . |
| 4,255,083 | 3/1981 | Andre et al. ............... 60/226.1 |

Primary Examiner—Richard A. Bertsch
Assistant Examiner—Howard R. Richman
Attorney, Agent, or Firm—Hughes & Multer

[57] ABSTRACT

Gas turbine engine power plants of the ducted fan type. During reversed thrust operation of the power plant, air is induced into the bypass duct through two inlets in one type of power plant is concerned. One of these, a secondary inlet, is located between a stationary front section of the bypass duct and a translated rear section. A gas or fluid such as air is injected at high velocity into the bypass duct to turn air induced through the secondary inlet into paths paralleling the longitudinal centerline of the duct or to accomplish this goal and also promote the attachment of induced air to the inner surface of the bypass duct. In both cases, the efficiency of the power plant in the reversed thrust mode of operation is increased. A second type of power plant of interest does not have a translatable rear section. Nevertheless, the operating efficiency of that type of engine can be promoted in the reversed thrust mode of operation by so injecting gas or fluid into the bypass duct as to promote the attachment of air moved through that duct by the power plant fan to its inner surface.

19 Claims, 5 Drawing Sheets

PRIOR ART

DUCTED FAN TYPE GAS TURBINE ENGINE POWER PLANTS

TECHNICAL FIELD OF THE INVENTION

The present invention relates to gas turbine engine power plants with engines of the ducted fan type and, more specifically, to power plants of that character with a novel, improved system for increasing the efficiency of the power plant in a reversed thrust mode of operation.

BACKGROUND OF THE INVENTION

FIG. 1 depicts a conventional gas turbine engine power plant 20 of the ducted fan type. The major components of this conventional power plant include a gas turbine engine 22 for driving a fan 24 which rotates about the longitudinal axis 26 of the power plant and a bypass duct 28 which surrounds fan 24. Air is pumped through bypass duct 28 by fan 24 to increase the mass rate of flow through the power plant and thereby increase the thrust it generates. Power plants of this type are designed for aircraft applications.

During takeoff and flight, power plant 20 generates thrust acting in the direction opposite that indicated by arrow $V_\infty$ in FIG. 1 (forward thrust). When the aircraft lands, the direction of the thrust and the direction of the mass flow through the fan, suggested by the arrow $V_{FAN}$, may be reversed to brake the aircraft. This is accomplished by reversing the pitch of fan blades 30. With this done, fan 24 induces air into bypass duct 28 as suggested by arrow 32 and pumps the induced air out the front end 34 of the bypass duct.

In a conventional engine as shown in FIG. 1, air induced into bypass duct 28, in the reversed thrust mode of operating the power plant, tends to separate to a large degree from the inner surface 36 of the bypass duct (the extent of separation is indicated by reference character 37). This makes fan 24 relatively inefficient as only the roots of the fan blades 30 will then play any significant part in pumping the induced air through bypass duct 28.

It was thought that this problem of air separation during the reversed thrust mode of operation could be overcome by flaring the rear end of the bypass duct. A power plant embodying this innovation is illustrated in FIG. 2 and identified by reference character 38. As can be seen from FIG. 2, this solution to the problem of air separation was not viable. Despite flare 40, air induced into the rear end 42 of bypass duct 44 during reversed thrust operation of power plant 38 still separated from the inner surface 46 of the bypass duct to an unacceptable, performance degrading extent as indicated by shaded area 48.

Yet another scheme for solving the problem of detached air in the reversed thrust operation of a ducted fan power plant is employed in the power plant 50 identified by reference character 50 in FIG. 3 and described in detail in U.S. Pat. No. 3,820,719 issued June 28, 1974 to Clark for GAS TURBINE ENGINES. In that power plant, the fan bypass duct 52 has a stationary forward section 54 and a rear section 56 which can be rectilinearly displaced or translated away from the forward section in the direction indicated by arrow 58 during reversed thrust operation. This forms an annular secondary inlet 60 through which additional air can be induced into bypass duct 52.

The shaded area identified by reference character 62 in FIG. 3 shows that this approach to solving the air separation problem encountered in reversed thrust operation of ducted fan power plants is still not satisfactory. Furthermore, it is apparent from FIG. 3 that the air induced into bypass duct 52 through the secondary inlet 60 must turn and follow paths generally parallel to the common longitudinal centerline 26 of the power plant and the bypass duct. To the extent that the induced air does not follow such a path—one of which is identified by reference character 64 in FIG. 3—it will comingle with air induced in the bypass duct through the rear end 66 of the translatable bypass duct section 56. This causes degradation in the reversed thrust performance of the power plant.

SUMMARY OF THE INVENTION

I have now invented, and disclosed herein, a novel approach to the reversed thrust operation of ducted fan power plants which significantly increases the thrust producing efficiency of the power plant. This is accomplished by using a high velocity fluid or gas such as air to turn air introduced into the bypass duct of a power plant as illustrated in FIG. 3 into paths paralleling the longitudinal axis of the bypass duct. Also, this high velocity gas or fluid may be employed to minimize or even entirely eliminate separation of induced air from the inner surface of the bypass duct. The high velocity gas or fluid used to obtain these significant and novel results is injected into the bypass duct through one or more flow devices located to the rear of the power plant's fan. The flow device(s) may be mounted in a stationary, forward section of the bypass duct or provided in a strut extending from the bypass duct to the power plant's gas turbine engine.

OBJECTS OF THE INVENTION

From the foregoing, it will be apparent to the reader that one important and primary object of the present invention resides in the provision of novel, improved methods and systems for increasing the efficiency of a ducted fan gas turbine engine power plant in a reversed thrust mode of operation.

Other also important but somewhat more specific objects of may invention reside in the provision of methods and apparatus as identified in the preceding object:

in which improved efficiency is achieved by turning air induced into the bypass duct through a secondary inlet into paths paralleling the longitudinal axis of the duct;

in which efficiency is produced both by turning the induced air as described in the preceding object and by promoting the attachment of induced air to the interior wall surface of the bypass duct.

Other important objects and features and additional advantages of my invention will be apparent to the reader from the foregoing and the appended claims and as the ensuing detailed description and discussion of the invention proceeds in conjunction with the appended claims.

DETAILED DESCRIPTION OF THE INVENTION

Figure 4:
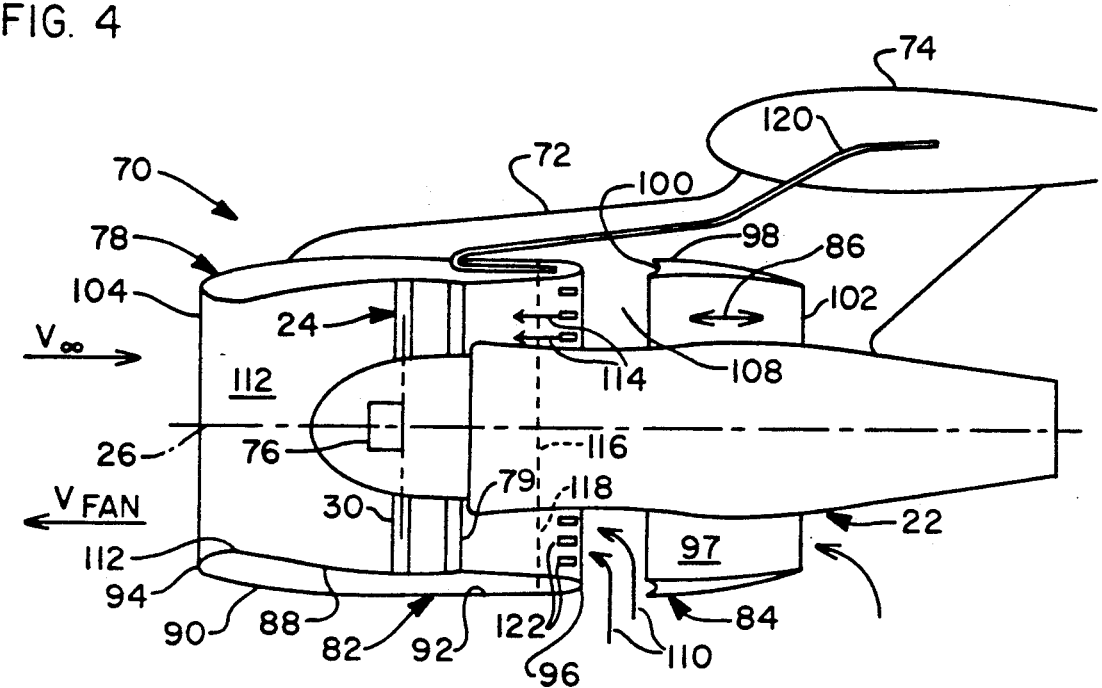
FIG. 4 is a somewhat more detailed but still pictorial view of a power plant similar to the one illustrated in FIG. 3, but differing in that greater efficiency is provided during reversed thrust operation in accordance with the principles of the present invention by so injecting air into the fixed section of the fan bypass duct as to promote: (a) the turning of air induced into that duct through an annular gap between the two bypass duct sections into a path paralleling the longitudinal axis of the bypass duct, and (b) the attachment of induced air to the inner surface of the fixed bypass duct section.

Referring again to the drawing, FIG. 4 depicts a gas turbine engine power plant 70 of the ducted fan type. The power plant is typically suspended by a pylon 72 from an aircraft wing 74.

Power plant 70, like those discussed above, includes a gas turbine engine 22 with a gas producer (not shown) for rotating a fan 24 with blades 30 about the longitudinal axis 26 of the power plant. Power plant 70 also includes: (1) a conventional pitch change mechanism 76 for adjusting the pitch of fan blades 30 for takeoff and for flight and for reversing the pitch of those blades to produce a reversed or braking thrust in the direction opposite that indicated by arrow $V_{FAN}$ when the aircraft lands; (2) a bypass duct 78; and (3) radial guide vanes 79. The bypass duct surrounds fan 24 in concentric relationship to the longitudinal axis 26 of power plant 70 and has air pumped therethrough by fan 24 in forward and reversed thrust operation of the power plant.

Like the bypass duct 52 discussed above, bypass duct 78 has a stationary forward section (identified by reference character 82) and a separate rear section 84 which can be rectilinearly translated away from and toward stationary bypass duct section 78 as indicated by double-headed arrow 86 in FIG. 4. The system by which this is accomplished may include tracks and screw jacks which are not shown but may be of the character described and illustrated in U.S. Pat. No. 3,820,719. The mechanism for translating the bypass duct rear section 84 will typically be controlled in coordination with pitch change mechanism 76 so that duct section 84 will be moved rearwardly and forwardly as the pitch of fan blades 30 is changed for reversed and forward thrust.

The fixed, forward section 82 of bypass duct 78 has inner and outer walls 88 and 90, a hollow interior 92, a rounded leading edge 94, and an also rounded trailing edge or bullnose 96.

The translatable, rear section 84 of bypass duct 78 has inner and outer walls 97 and 98, a concave leading edge 100 which is configured to match the bullnose 96 of forward bypass duct section 78, and a sharp trailing edge 102.

The two duct sections are axially aligned and concentric with the longitudinal axis 26 of power plant 70. Also, each of the two duct sections has a cylindrical configuration with two open ends and a quasi-circular cross section. Forward duct section 82, in particular, has a barrellike configuration.

Figure 7:
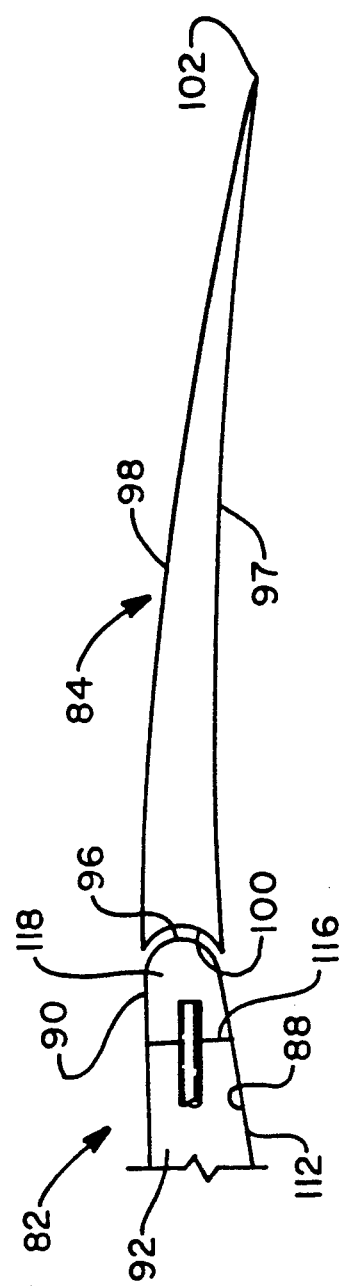
FIG. 7 is a partial, pictorial view of a power plant as shown in FIG. 4 or in FIG. 5 with the rear section of the power plant's bypass fan duct adjacent the fixed, forward section of the that duct as it is in the forward thrust mode of operation.

With power plant 70 operated to produce forward thrust for takeoff and flight and bypass duct rear section 84 therefore translated forwardly, bullnose 96 is seated in the concave leading edge 100 of rear bypass duct section 84; and the duct has the smooth, essentially uninterrupted and gastight, airfoil profile shown in FIG. 7. Air is induced into the open, forward end 104 of the bypass duct and, after being pumped to a higher pressure by fan 24, is discharged through the rear end of the duct—which is coincident with the trailing edge 102 of translatable duct section 84—to produce forward thrust in the direction opposite that indicated by arrow $V_{\infty}$ in FIG. 4.

Figure 1:
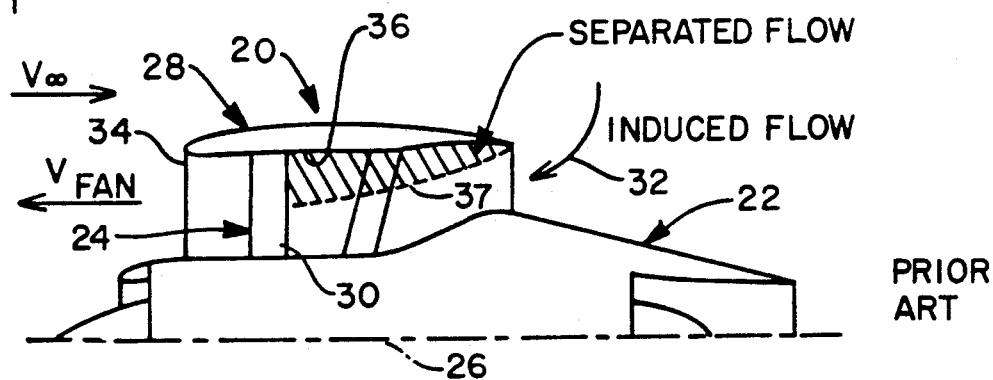
FIG. 1 is a partial and pictorial view of a conventional ducted fan gas turbine engine power plant with a thrust reversing capability.
Figure 2:
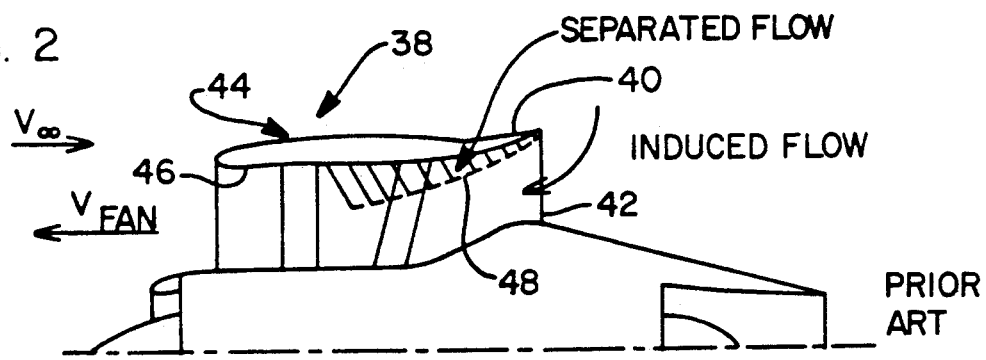
FIG. 2 is a view, similar to FIG. 1, of a power plant like that shown in FIG. 1 but modified to increase efficiency during thrust reversing operation by promoting the attachment of air induced into the fan bypass duct to the interior surfaces of that duct.
Figure 3:
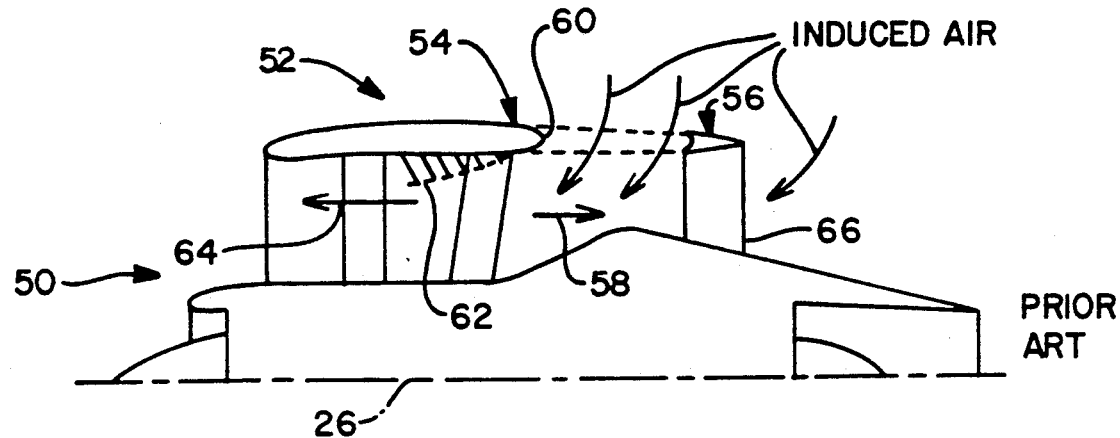
FIG. 3 is a view similar to FIGS. 1 and 2 of yet another prior art power plant modified by the inclusion of a fan bypass duct having a fixed forward section and a translatable rear section to promote the attachment of inflowing air to the bypass duct during thrust reversing operation of the power plant.
Figure 8:
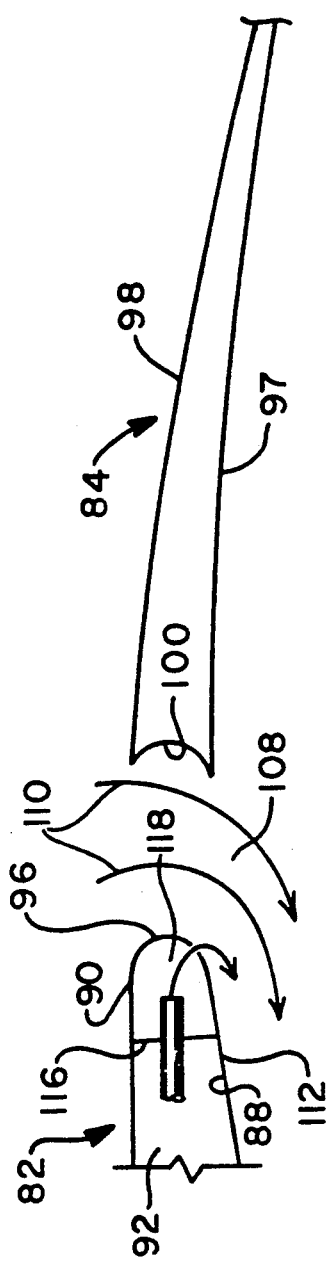
FIG. 8 is a view similar to FIG. 7 but: (a) with the rear section of the fan bypass duct translated away from that duct's forward section as it is in reversed thrust operation of the power plant so that air can be induced into the fan bypass duct through the gap (or secondary inlet) between the two sections of the duct, and (b) with air being injected into the fixed forward duct section in the manner and for the purposes identified above.

In the reversed thrust mode of operation employed to slow an aircraft after it has touched down, duct section 84 is translated rearwardly as shown in FIGS. 4 and 8, exposing an annular gap 108 between the forward and rear sections 82 and 84 of bypass duct 78. This gap functions as a secondary inlet through which air can be induced into bypass duct 78 as indicated by flow arrows 110 and in a manner akin to that discussed above with respect to the prior art power plant 50 depicted in FIG. 3.

A salient feature of power plant 70, and provided in accordance with the principles of my invention, is a system for injecting a gas or fluid, typically air, at high velocity into bypass duct 78 to the rear of fan 24 and, more specifically, in the vicinity of bullnose 96. This air is typically injected at a small angle to the exposed, inner surface 112 of the fixed bypass duct section inner wall 88 and toward the forward end or nose 94 of the bypass duct as indicated by arrows 114 in FIG. 4. The high velocity fluid or gas may also be introduced at such other favorable locations to the rear of the fan as will promote attachment and/or turning of the induced gas or fluid.

As discussed above, the high velocity injection of a gas or fluid into the forward bypass duct section 82 at bullnose 96 increases the efficiency of power plant 70 in the reversed thrust mode of operation by: (1) turning air induced into the duct through secondary inlet 108 into paths paralleling the longitudinal axis 26 of the power plant and bypass duct 78, or (2) by both producing this beneficial effect and by promoting the attachment of the induced air to the inner wall surface 112 of fixed bypass duct section inner wall 88, thereby increasing the efficiency of fan 24.

The major components of the system for injecting the gas or fluid into duct section 82 (see FIGS. 4 and 6) typically include: (1) an annular partition 116 which spans the inner and outer walls 88 and 90 of fixed bypass duct section 82 ahead of bullnose 96 to provide an inlet plenum 118; (2) a line 120 for delivering the injection gas or fluid to inlet plenum 118; and (3) a set of slotlike nozzles 122 for directing the injection gas or fluid from plenum 118 at high speed and toward the forward end of bypass duct 78.

In that embodiment of the invention identified by reference character 70 and depicted in FIG. 4, it is air that is injected; and an air supply line 120 is connected to an external source. As suggested in that Figure, the air supply line may be routed to the aircraft wing 74 and there connected to a suitable fitting (not shown) so that the supply line can tap into an air source within the aircraft.

Figure 6:
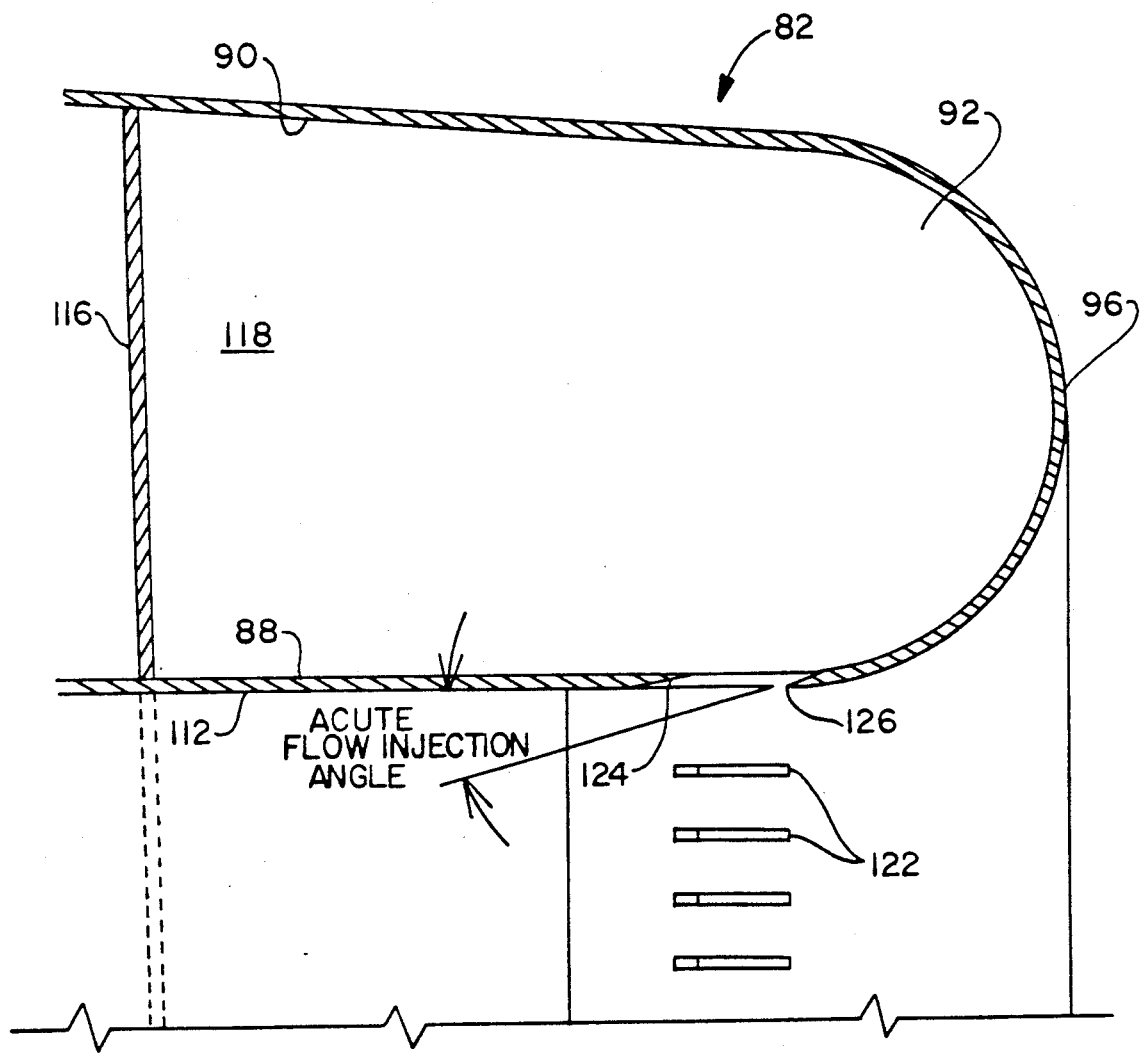
FIG. 6 is a partial section of the fixed fan bypass duct section of a gas turbine engine power plant embodying the principles of my invention; this figure depicts a scheme for injecting air for the purposes identified above from the hollow interior of that duct section into the interior of the duct.

Referring now in particular to FIG. 6, the nozzles 122 for the injection gas or fluid are formed in the inner wall 88 of bypass duct fixed section 82 at spaced intervals around the periphery of that wall. The axes of elongation of the nozzles may extend in generally the same direction as the longitudinal axis 26 of power plant 70 but may be skewed so that gas or fluid discharged from those nozzles will flow tangentially around the inner surface 112 of forward duct section inner wall 88. The leading and trailing edges 124 and 126 of the nozzles have cooperating, nozzle forming configurations. The nozzles are typically oriented with their axes of elongation at an acute angle relative to the inner surface 88 of the bypass duct. In a typical application of my invention, there is a set of nozzles arrayed around the periphery of the bypass duct inner surface 88. The nozzles 122 are shown in FIG. 6.

Figure 5:
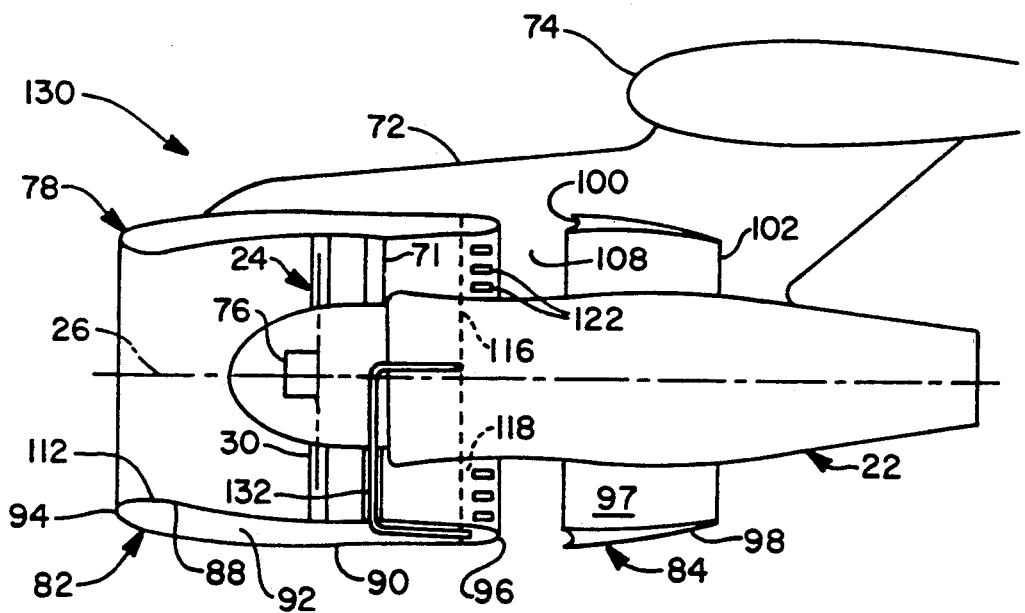
FIG. 5 is a view similar to FIG. 4 of a power plant employing the principles of the present invention and differing from the power plant illustrated in FIG. 4 in that it employs a different source for air induced into the bypass fan duct during reversed thrust operation of the power plant.

Referring still to the drawing, FIG. 5 depicts a second gas turbine engine power plant 130 of the ducted fan type. This power plant is essentially identical to the power plant 70 illustrated in FIG. 4 and discussed above, differing primarily in that it has an injection air supply line 132 which is connected to a tap through the casing of the gas turbine engine compressor (not shown) to supply compressor bleed air to the injection inlet plenum 118 in the fixed, forward section 82 of bypass duct 78.

Figure 9:
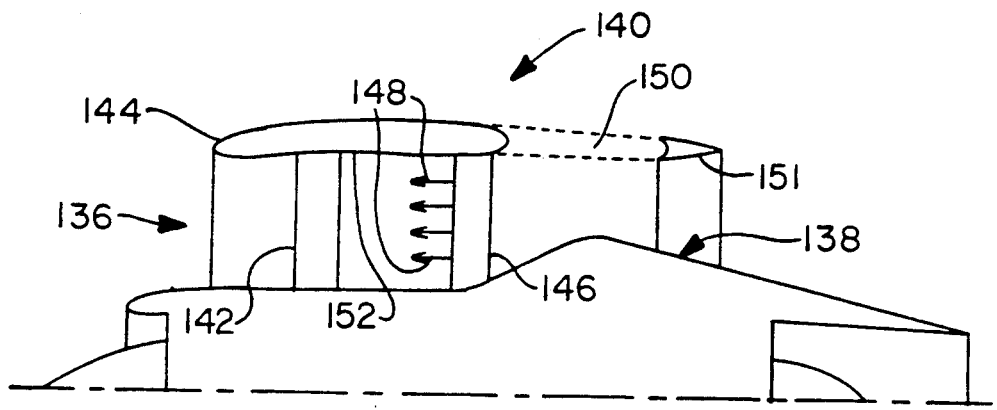
FIG. 9 is a fragmentary view of another power plant embodying the principles of the present invention; in this power plant, the injection system is provided in radial struts located to the rear of the power plant's fan.

FIG. 9 shows a power plant 136 which differs from those discussed above in that the high velocity gas or fluid is injected into the bypass duct via nozzles (not shown) in radial struts which are spaced around and extend between the gas turbine engine 138 and the bypass duct 140 of the power plant and are located behind the fan 142 of the power plant in the front, fixed section 144 of the bypass duct.

As is true in those embodiments of the invention described above, air (or another gas or fluid) injected into bypass duct 140 through the secondary inlet 150 between the stationary front and translatable rear sections 144 and 151 of the duct increases the operating efficiency of power plant 136 by: (1) turning air induced into the duct through secondary inlet 150 into paths paralleling the longitudinal axis of the power plant and bypass duct, or (2) by both producing this beneficial effect and also increasing efficiency by promoting the attachment of the induced gas or fluid to the inner wall surface 152 of fixed bypass duct section 144.

Figure 10:
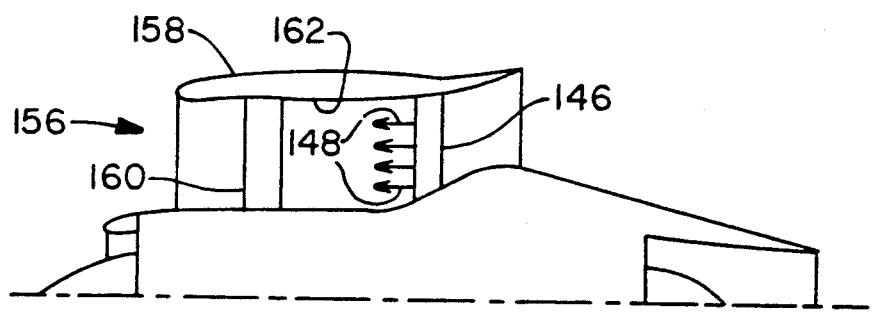
FIG. 10 is a view similar to FIG. 9 of yet another power plant employing the principles of the present invention; in this case the bypass duct does not have a displaceable rear section but the injection system nevertheless improves efficiency by promoting the attachment of air flowing through the bypass duct to inner wall surfaces of the duct.

The power plant 156 illustrated in FIG. 10 differs from those considered above primarily in that its bypass duct 158 does not have a translatable rear section. Nevertheless, the operating efficiency of such a power plant can be promoted by injecting a gas or fluid into its bypass duct in accordance with the principles of the present invention to promote the attachment of air moved through bypass duct 158 by power plant fan 160 to the inner wall surface 162 of the duct.

In typical applications employing the injection scheme shown in FIGS. 9 and 10, it will be air that is injected into the bypass duct 140 or 158. The air can be delivered under pressure from a source such as one of those described above to a plenum (not shown) in the interior of a strut 146 and injected through appropriate nozzles (likewise not shown) from the plenum into the bypass duct.

The invention may be embodied in still other forms without departing from the spirit or essential characteristics thereof. The embodiments of that invention discussed above are therefore to be considered in all respects as illustrative and not restrictive, the scope of the invention being indicated by the appended claims rather than the foregoing description; and all changes which come within the meaning and range of equivalency of the claims are therefore intended to be embraced therein.

What is claimed is:

1. A ducted fan type power plant which is capable of generating reverse thrust and comprises:
   a. a gas turbine engine;
   b. a fan driven by said engine;
   c. an elongated bypass duct which surrounds said fan;
   d. means for generating a supply of high velocity fluid;
   e. means for injecting the high velocity fluid into said bypass duct from a locus to the rear of said fan to promote the attachment of air moved therethrough to the inner surface of the bypass duct; and
   f. means for delivering the high velocity fluid from said generating means to said injecting means.

2. A ducted fan type power plant which is capable of generating reverse thrust and comprises:
   a. a gas turbine engine;
   b. a fan driven by said engine;
   c. an elongated bypass duct which is open at its front and rear ends and surrounds said fan, said bypass duct having a fixed forward section and a rear section which can be translated away from said fixed section as the pitch of the fan blades is reversed to reverse the flow of air through said bypass duct and generate a thrust directed from the front toward the rear of the power plant, thereby allowing air to be induced into said bypass duct through the downstream end thereof and also through the annular gap between the fixed and translated, rear sections of the bypass duct;

d. means for generating a supply of high velocity fluid;

e. means for injecting the high velocity fluid into the bypass duct from a locus to the rear of said flow to:
   (i) turn air induced into said bypass duct through the annular gap between the fixed and translated, rear sections of the bypass duct into paths generally paralleling the longitudinal axis of that duct, or
   (ii) turn air induced into said bypass duct into parallel paths as aforesaid and promote the attachment of air to the inner surface of the fixed bypass duct section; and f. means for delivering the high velocity fluid from said generating means to said injecting means.

3. A ducted fan type power plant which is capable of generating reverse thrust and comprises:

a. a gas turbine engine;

b. a fan driven by said engine;

c. an elongated bypass duct which is open at its front and rear ends and surrounds said fan, said bypass duct having a fixed forward section and a rear section which can be translated away from said fixed section as the pitch of the fan blades is reversed to reverse the flow of air through said bypass duct and generate a thrust directed from the front towards the rear of the power plant, thereby allowing air to be induced into said bypass duct through the downstream end thereof and also through the annular gap between the fixed and translated, rear sections of the bypass duct;

d. means for generating a supply of high velocity fluid;

e. means for injecting the high velocity fluid into the fixed section of the bypass duct to:
   (i) turn air induced into said bypass duct through said annular gap between the fixed and translated, rear sections of the bypass duct into paths generally paralleling the longitudinal axis of that duct, or
   (ii) turn air induced into said bypass duct into parallel paths as aforesaid and promote the attachment of air to the inner surface of the fixed bypass duct section; and f. means for delivering the high velocity fluid from said generating means to said injecting means.

4. A ducted fan type power plant as defined in any one of the preceding claims 1-3 in which the means for injecting the fluid into the bypass duct is housed in the bypass duct.

5. A ducted fan type power plant as defined in any one of the preceding claims 1-3 which has strut means extending between the bypass duct and the gas turbine engine, the means for injecting the fluid into the bypass duct being comprised by said strut means.

6. A power plant as defined in any one of the preceding claims 1-3 in which the means for generating the supply of high velocity fluid is external to said power plant.

7. A power plant as defined in any one of the preceding claims 1-3 in which the means for generating the supply of high velocity fluid is the compressor of the power plant's gas turbine engine.

8. A power plant as defined in either claim 2 or 3, wherein the fixed, front section of the bypass duct is hollow and has an inner wall and wherein the means for injecting the fluid into said bypass duct comprises a nozzle means at the periphery of the bypass duct and rearwardly of the power plant's fan, said nozzle means having an inlet means communicating with the interior of the bypass duct and outlet means opening onto the inner surface of the inner duct wall and said nozzle means being oriented to inject said fluid flowing therethrough into said duct at an acute angle relative to said duct wall surface and toward the front end of the duct.

9. A ducted fan type power plant which is capable of generating reverse thrust and comprises:

a. a gas turbine engine;

b. a fan driven by said engine;

c. an elongated bypass duct which surrounds said fan; and d. means for generating a supply of high velocity fluid;

e. injecting means for injecting the high velocity fluid into said bypass duct towards said fan from a locus to the rear of said fan when said power plant is in its reversed thrust operating mode; and f. means for delivering the high velocity fluid from said generating means to said injecting means.

10. A ducted fan type power plant as defined in claim 9 in which the injecting means is located in the bypass duct.

11. A ducted fan type power plant as defined in claim 9 further comprising strut means extending between the bypass duct and the gas turbine engine, the injecting means being comprised by said strut means.

12. A power plant as defined in claim 9 in which the means for generating the supply of high velocity fluid is external to said power plant.

13. A power plant as defined in claim 9 in which the means for generating the supply of high velocity fluid is the compressor of the power plant's gas turbine engine.

14. A power plant as defined in claim 9, wherein the injecting means comprises: (a) a plenum that is in communication with the fluid delivering means and is defined within an outer surface of an inner wall and an inner surface of an outer wall of the bypass duct and (b) a nozzle means at the periphery of the bypass duct and rearwardly of the power plant's fan, said nozzle means having an inlet means communicating with the plenum and outlet means opening onto the inner surface of the inner duct wall and said nozzle means being so oriented that the fluid introduced into the plenum by the fluid delivering means flows through said outlet means of the nozzle means at an acute angle relative to said duct inner wall surface and toward the front end of the duct.

15. A power plant as defined in claim 14 in which the means for generating the supply of high velocity fluid is is external to said power plant.

16. A power plant as defined in claim 14 in which the means for generating the supply of high velocity fluid is the compressor of the power plant's gas turbine engine.

17. A power plant as defined in claim 9 in which:
the bypass duct has a fixed forward section and a rear section which can be translated away from said fixed section as the pitch of the fan blades is reversed to reverse the flow of air through said bypass duct and generate a thrust directed from the front toward the rear of the power plant, thereby allowing air to be induced into said bypass duct through the downstream end thereof and also through the annular gap between the fixed and translated, rear sections of the bypass duct; and said injecting means injects the gas from nozzles located on the fixed section near the annular gap between the fixed and translated, rear sections of the bypass duct.

18. A power plant as defined in claim 17, wherein the injecting means comprises: (a) a plenum that is in communication with the fluid delivering means and is defined within an outer surface of an inner wall and an inner surface of an outer wall of the fixed, front section of the bypass duct and (b) a nozzle means having an inlet means communicating with the plenum and an outlet means opening onto the inner surface of the inner duct wall and said nozzle means being so oriented that the fluid introduced into the plenum by the fluid delivering means flows through said outlet means of the nozzle means at an acute angle relative to said duct inner wall surface and toward the front end of the duct.

19. A ducted fan type power plant which is capable of generating reverse thrust and comprises:
a. a gas turbine engine;
b. a fan driven by said engine;
c. an elongated bypass duct which surrounds said fan; and
d. injecting means located within a structural member of said power plant for injecting a fluid from the structural member into said bypass duct towards said fan from a locus to the rear of said fan when said power plant is in its reversed thrust operating mode and
e. means for delivering bleed air from the compressor of the power plant's gas turbine engine to the injecting means.

* * * * *